Patented Oct. 14, 1952

2,614,063

UNITED STATES PATENT OFFICE 2,614,063

PREPARATION OF CATALASE FROM RED BLOOD CELLS AND WHOLE BLOOD

Havard L. Keil, Clarendon Hills, Ill., assignor to Armour and Company, Chicago, Ill., a corporation of Illinois No Drawing. Application January 6, 1949, Serial No. 69,608

10 Claims. (Cl. 195—62)

This invention relates to the preparation of catalase from red blood cells and whole blood.

Catalase is an enzyme known to be present in living tissues of plant and animal origin. The enzyme is desired for several purposes, one specific advantage being that it destroys the peroxide of hydrogen. The enzyme in the living tissues is probably necessary for growth and development of cellular structures through its ability to destroy the hydrogen peroxide formed during the performance of metabolic processes.

An object of the present invention is to provide a process for the preparation of catalase from red blood cells and whole blood. A still further object is to provide a process of few and simple steps yielding catalase in relatively large volume and in a condition for ready recovery by decantation of the liquid, centrifuging, etc. Other specific objects and advantages will appear as the specification proceeds.

In one embodiment of the invention, a liquid consisting of red blood cells was diluted with water which was previously carbonated by the addition of solid carbon dioxide until the pH was 5.5–6. Sodium aluminum sulphate was next stirred in to reduce the pH for bringing about the precipitation of the catalase. After settling overnight at room temperature, the supernatant liquid was pumped from the top. The precipitated catalase in the form of a slurry was passed through a centrifuge which further removed liquids. The resulting catalase was dried to produce a dry product and a portion was also mixed with an equal weight of glycerol to provide a paste. The product after a long storage was found to have no loss of enzymatic activity or bacterial decomposition. This was true after periods of storage at refrigerator, room, and incubator temperatures.

In the foregoing process, I find that the carbon dioxide stabilizes the enzyme in some way and apparently renders it more soluble. I prefer to add it as solid carbon dioxide in tap water and a sufficient amount of the water is added to the whole blood or red blood cells to bring the pH to about 5.5–6.

The sodium aluminum sulphate is found to be particularly effective in precipitating the catalase. I prefer to add a sufficient quantity of the sulphate to bring the pH to about 4.8–4.9.

The glycerol need not be added to the final product when the catalase is to be sold as a dry product. However, I find that a catalase paste is particularly desirable as a product and in this the glycerol acts as a dispersing agent or solubilizer, as well as a preservative. A good product is obtained when an equal amount of glycerol is mixed with the paste.

The following examples may be set out as illustrative of the invention:

Example I

A liquid body consisting of red blood cells was diluted 20 times with tap water which was previously carbonated by the addition of solid carbon dioxide until the pH was 5.5–6. A 20% solution of sodium aluminum sulphate was next stirred in until the pH fell to 4.8–4.9 when catalase precipitated. After settling overnight at room temperature, the supernatant liquid was pumped from the top. The precipitated catalase in the form of a slurry was centrifuged to produce a paste containing about 16% dry matter. This catalase on a dry weight basis showed a 4% yield on red blood cells and a 11% yield on a dry red blood cell basis.

An equal weight of glycerol was mixed with paste and held over a period of five weeks at refrigerator, room and incubator temperatures with no loss of enzymatic activity or bacterial decomposition. The catalase was found to be most active in high water dilutions.

Example II

Whole blood was diluted with 20 volumes of tap water previously carbonated by the addition of solid carbon dioxide until the pH of the mixture was about 5.5–6. Enough sodium aluminum sulphate was next stirred in to bring the pH to about 4.8–4.9 when the catalase precipitated. The liquid blood, freed of the catalase, was pumped from the top of the vat after the material had been allowed to stand overnight. The precipitated catalase was passed through a centrifuge which further removed liquids. It was then washed and dried. A portion of the product was mixed with glycerol in equal proportions to form a paste.

Both of the products recovered in the above examples were tested and found highly efficient in the destruction of hydrogen peroxide.

After the addition of the sodium aluminum sulphate, flocculation was evident within fifteen minutes and upon standing for a few hours a solid precipitate resulted. The dry product or the glycerol-catalase mixture were both readily dispersed in water and showed a high rate of stability.

While in the foregoing specification, I have set forth specific steps in considerable detail for the purpose of illustrating one phase of the invention, it will be understood that such details of procedure may be varied widely by those skilled in the art without departing from the spirit of my invention.

I claim:

1. In the preparation of catalase from liquid selected from the group consisting of red blood cells and whole blood, the steps of mixing with the liquid carbon dioxide, adding sodium aluminum sulphate to precipitate the catalase, and separating the precipitate from the liquid.

2. In the preparation of catalase from liquid selected from the group consisting of red blood cells and whole blood, the steps of adding an aqueous solution of carbon dioxide to the liquid, mixing sodium aluminum sulphate with the mixture to precipitate the catalase, and separating the precipitate from the liquid.

3. In the preparation of catalase from liquid selected from the group consisting of red blood cells and whole blood, the steps of adding carbon dioxide to the liquid to bring the pH to about 5.5–6, and then adding sodium aluminum sulphate to precipitate the catalase.

4. In the preparation of catalase from liquid selected from the group consisting of red blood cells and whole blood, the steps of adding carbon dioxide until the pH is about 5.5–6, and then adding sodium aluminum sulphate to bring the pH to about 4.8–4.9 to precipitate the catalase, and separating the precipitate from the liquid.

5. In the preparation of catalase from liquid selected from the group consisting of red blood cells and whole blood, the steps of mixing water and solid carbon dioxide, adding the carbonated water to the said liquid until the pH is about 5.5–6, and then adding sodium aluminum sulphate in sufficient quantity to precipitate the catalase.

6. In the preparation of catalase from liquid selected from the group consisting of red blood cells and whole blood, the steps of mixing water and solid carbon dioxide, adding the carbonated water to the said liquid until the pH is about 5.5–6, then adding sodium aluminum sulphate in sufficient quantity to precipitate the catalase, and separating the precipitate from the liquid, and drying the precipitate.

7. In the preparation of catalase from liquid selected from the group consisting of red blood cells and whole blood, the steps of mixing water and solid carbon dioxide, adding the carbonated water to the said liquid until the pH is about 5.5–6, then adding sodium aluminum sulphate in sufficient quantity to precipitate the catalase, separating the precipitate from the liquid, and mixing the precipitate with glycerol.

8. In the preparation of catalase from liquid selected from the group consisting of red blood cells and whole blood, the steps of mixing water and solid carbon dioxide, adding the carbonated water to the said liquid until the pH is about 5.5–6, then adding sodium aluminum sulphate in sufficient quantity to precipitate the catalase, separating the precipitate from the liquid, and mixing the precipitate with an equal amount of glycerol.

9. In the preparation of catalase from red blood cells, the steps of adding carbon dioxide to bring the pH to about 5.5–6, and then mixing sodium aluminum sulphate with the mixture to precipitate the catalase.

10. In the preparation of catalase from red blood cells, the steps of mixing water carbonated with solid carbon dioxide with the red blood cells to bring the pH to about 5.5–6, and then adding sodium aluminum sulphate to bring the pH to about 4.8–4.9 for precipitating the catalase.

HAVARD L. KEIL.

REFERENCES CITED

The following references are of record in the file of this patent:

UNITED STATES PATENTS

| Number | Name | Date |
| --- | --- | --- |
| 2,118,117 | Sevag | May 24, 1938 |

OTHER REFERENCES

Kiese, Chemical Abstracts, 1941, page 518.
Laskowski et al., Science 94, page 615 (1941).